H. A. WEBB.
PNEUMATIC AUTOMOBILE TIRE.
APPLICATION FILED JAN. 26, 1918.
1,273,964.
Patented July 30, 1918.
3 SHEETS—SHEET 1.
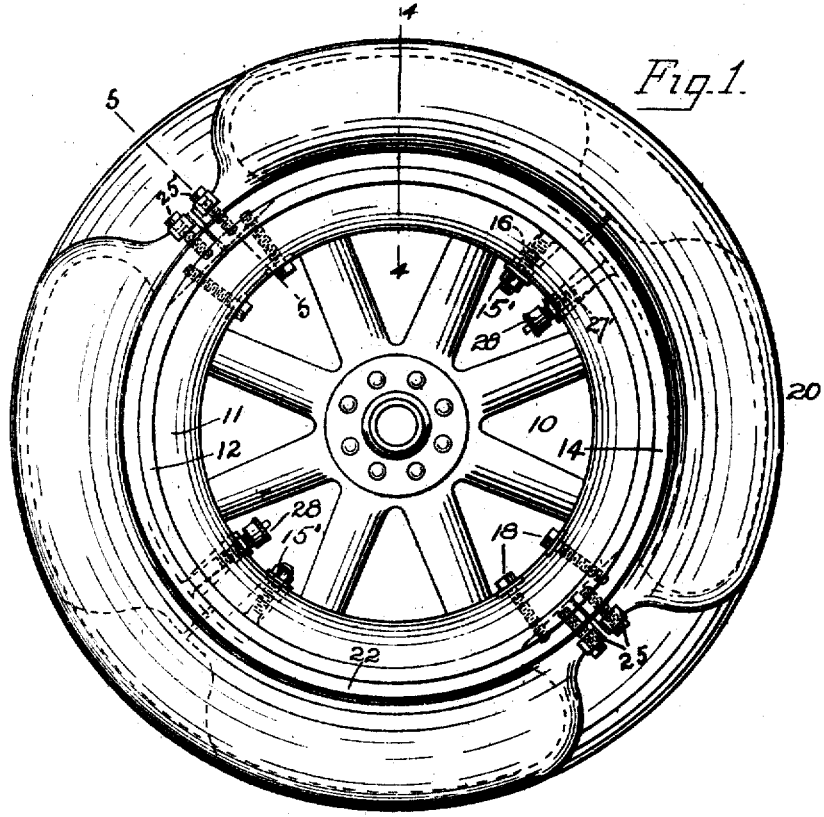
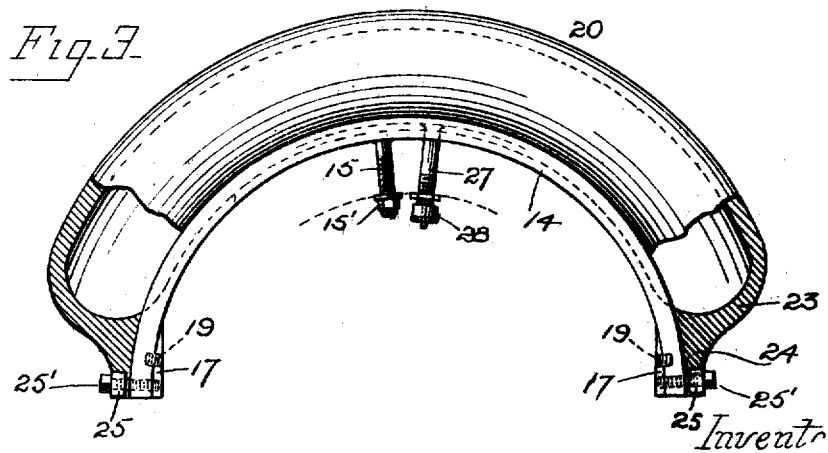

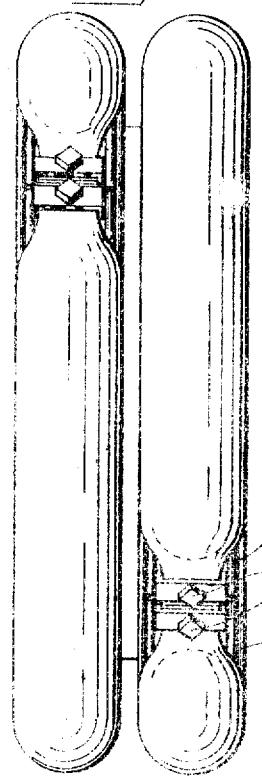
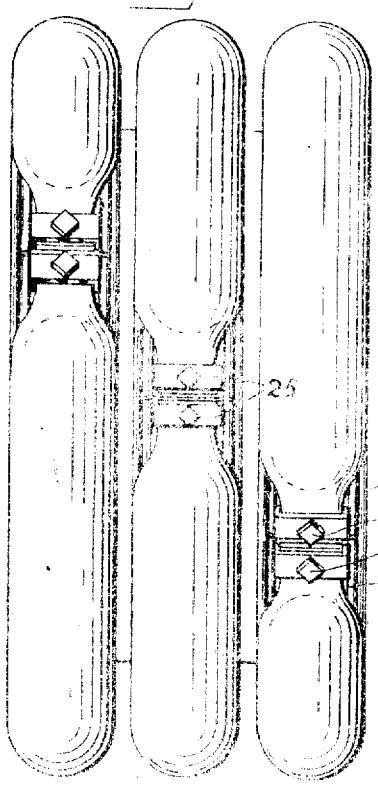
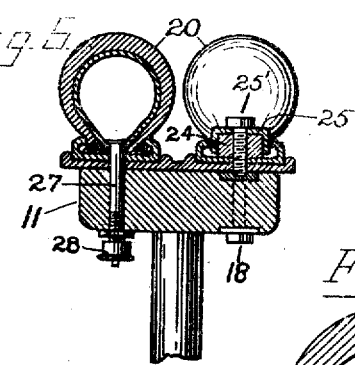
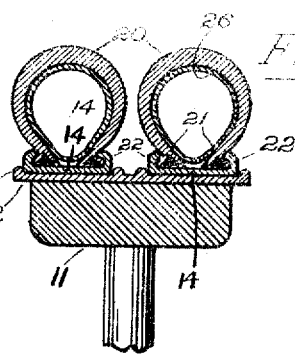
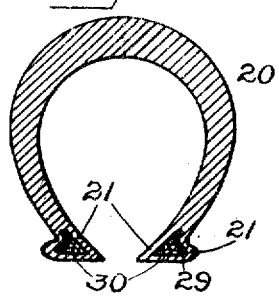

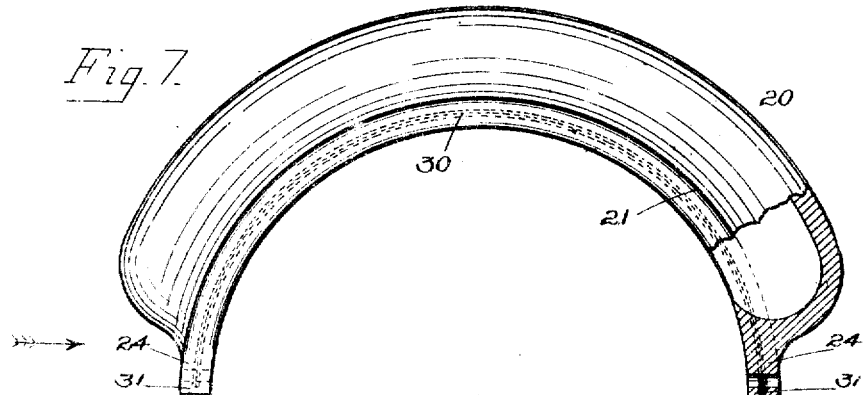
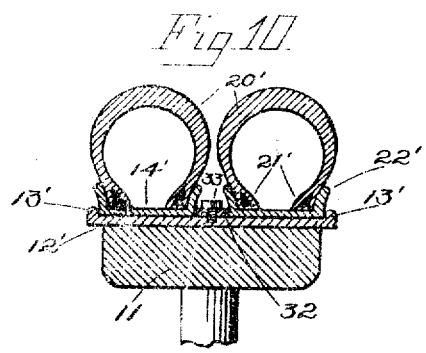
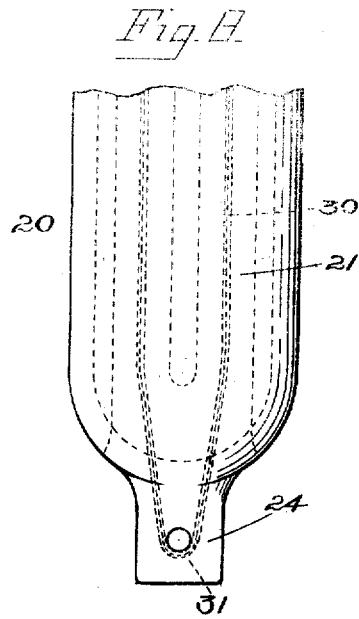
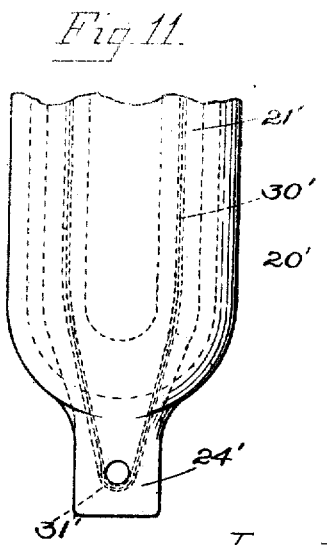

UNITED STATES PATENT OFFICE.

HARRY A. WEBB, OF HAMDEN, CONNECTICUT.

PNEUMATIC AUTOMOBILE-TIRE.

1,273,964.    Specification of Letters Patent.    Patented July 30, 1918.

Application filed January 26, 1918. Serial No. 213,898.

*To all whom it may concern:*

Be it known that I, HARRY A. WEBB, a citizen of the United States, residing in Hamden, in the county of New Haven and State of Connecticut, have invented certain new and useful Improvements in Pneumatic Automobile-Tires, of which the following is a full, clear, and exact description.

This invention relates to pneumatic automobile tires, and more particularly to an inflatable tire that is built in sections, each of which extends but part way around the wheel, in order that the sections may be removed from the wheel in a radial direction when the securing means have been released, instead of laterally as is now the customary way of removing tires from their wheels.

One object of this invention is to provide an automobile tire that is formed of independent sections which may be readily removed and applied to an automobile wheel.

A further object is to provide a tire formed of independent sections, in order that if one section should be worn out or damaged to such an extent that it is no longer suitable for use, it may be replaced by a good section, instead of discarding the entire tire, as is now necessary.

Still another object is to provide a tire of independent sections, in order that the section which is off the ground may be removed from its wheel without necessitating the jacking up of the wheel.

A more particular object of my invention is to provide pneumatic tires that are especially adapted for use upon automobile truck wheels. For many reasons, it would be desirable to use pneumatic tires upon automobile trucks, but this has not been practical, particularly for the following reasons: Large, heavy trucks require upon each wheel either a large and an exceptionally strong pneumatic tire which is extremely expensive to manufacture, or a plurality of moderately large tires arranged side by side upon each wheel, which are very difficult to remove from the wheel. The practical difficulty, which has been experienced in attempting to provide a single tire which possesses sufficient strength and is otherwise suitable to carry the load of a heavy truck, has been that such a tire must be very large in cross-sectional diameter—for instance, about ten inches, and must be extremely strong and heavy, as a tire ten inches in internal diameter requires an internal air pressure of several hundred pounds to the square inch, in order to remain well inflated when the truck upon which it is mounted is heavily loaded. Such a tire, although fairly durable, is extremely expensive to manufacture, the price being practically prohibitive. The difficulty that has been experienced in attempting to use a plurality of smaller pneumatic tires upon each wheel of a truck has been that it is extremely difficult to remove the inside tire from the wheel when the same becomes damaged or punctured, it usually being necessary to remove the wheel from the truck in order to get the inside tire off the wheel. The more particular object of my invention, as above indicated, is to provide pneumatic truck tires that overcome the last mentioned difficulty, which I accomplish by making each tire of two or more independent sections which are so constructed that any section may be easily and quickly removed from its wheel in a radial direction without disturbing any of the other sections upon the wheel.

To these and other ends, the invention consists in the novel features and combinations of parts to be hereinafter described and claimed.

In the accompanying drawings:

Figure 1 is a side view of an automobile wheel having my improved tires formed in sections mounted thereupon;

Fig. 2 is a tread view of the same;

Fig. 3 is a side view of a demountable rim section having a section of my improved tire secured thereto, the tire being shown as partly broken away;

Fig. 4 is a sectional view taken on line 4—4 of Fig. 1;

Fig. 5 is a sectional view taken on line 5—5 of Fig. 1;

Fig. 6 is an enlarged sectional view of one of the tires shown in Figs. 1–5 inclusive;

Fig. 7 is a side view of the tire section shown in Fig. 3, the tire being shown removed from its rim section;

Fig. 8 is an enlarged view of a portion of the tire shown in Fig. 7, looking in the direction of the arrow;

Fig. 9 is a modification showing a tread view of an automobile truck wheel having three sectional tires mounted thereon;

Fig. 10 is a sectional view similar to Fig. 4, showing a modification. In this view I have shown my improvement as applied to what is known as a straight-side tire in place of the clencher tire shown in Fig. 4; and Fig. 11 is a view similar to Fig. 8, showing an enlarged view of one end of the straight-side tire shown in Fig. 10.

In the drawings, I have shown an automobile truck wheel having my improved tire secured thereto, which wheel I have indicated generally by the numeral 10. This wheel is provided with the usual type of felly 11, upon the outer surface of which is mounted a tire band 12. This band 12 is provided with a plurality of ribs 13 formed upon the outer surface thereof and extending around the same. These ribs 13 form what may be termed a trough, in which is seated the sections 14 of which the demountable rim is composed. The ribs 13 should be so positioned that they contact with the sides of the sections 14 and prevent any lateral movement thereof. Each of the sections 14 is preferably provided with a rigid threaded bolt 15, which is positioned at substantially equal distance from the ends of the section, and extends through the felly of the wheel upon which the section is mounted and in a direction toward the hub of the same. The opening 16 formed in the felly of the wheel, through which the bolt 15 projects, should be made oblong in cross-section, in order that the bolt may be freely slid into and out of the same. Each of the rim sections 14 is preferably provided with a wedge-shaped lug or block 17 formed upon the inner face thereof. The object of this lug is to increase the thickness of the walls of the rim at each end thereof, in order to increase the depth of the thread holes formed at each end of the rim 14. The object in providing these thread holes will be hereinafter more fully described. The tire band 12 is preferably provided with grooves formed therein, adapted to receive the lugs 17, in order that the rim section 14 may properly seat upon this tire band between the ribs 13. In order that each rim section 14 may be rigidly secured to its wheel, lag bolts 18 are provided, which bolts are inserted through openings formed in the felly of the wheel and have their outer ends screwed into corresponding threaded openings 19 formed in each end of the section 14. From the structure so far described, it will be apparent that the sections 14 may be firmly secured to the automobile wheel by means of the bolts 18 and the nut 15', and that the rim sections 14 may be very quickly and easily removed from the wheel by simply removing the two bolts 18 and the nut 15', whereupon the rim section may be removed from the wheel in an outward radial direction.

Each of the rim sections 14 above described is provided with a section of a pneumatic tire, designated in its entirety by the numeral 20. This tire is preferably made similar to those now in general use, in that it has the usual beaded portion 21, which engages a corresponding flanged portion 22 formed upon each edge of the rim section 14, but differs from the tires now in general use in that each section 20 is provided with a rounded closed end, as indicated by 23, and is further provided with a reduced, flattened portion 24, which is preferably formed by drawing the tubular portion 20 into a reduced flattened end, rectangular in cross-section, as indicated in Fig. 5, which flattened end is preferably provided with a drill hole. The flattened ends 24 are securely fastened to the section 14 by a clamp 25 and threaded bolt 25', which bolt passes through the drill hole and has threaded engagement with the section 14 and the lug 17 above mentioned. The casing or shoe 20 is preferably provided with an inner tube 26, which is similar to the inner tubes now in general use, except that the ends of this tube are closed, in order that it may conform to the interior of the casing 20. This inner tube is provided with the usual type of valve 27, having a valve cap 28, which valve slides freely through an elongated hole 27' formed through the wheel felly 11. From the above description of the tire section 20, it will be seen that this section may be mounted upon or removed from the rim section 14 in a manner quite similar to the automobile tires now in general use, as it has the usual clenching engagement between the beads 21 and flanges 22. However, before the tire casing can be removed from its sectional rim, the bolts 25', above described, must be removed, whereupon the ends of this casing will no longer be retained in place, and if the air has been permitted to escape from the inner tube, the casing may be easily unclenched from the flanges 22 and removed from the rim section 14, which rim section, if desired, may be made of heavier and thicker metal than the demountable rims now in general use, as this rim does not have to be bent in removing or applying a tire thereto as is now necessary in some demountable rims.

In order to construct the flattened portions 24 so that they will be strong enough to withstand the strain to which they will be submitted in retaining the tire section in place upon its wheel, I provide means for reinforcing the same. This means consists in providing the beaded portions 21 of my tire 20 with reinforcing strips of hard rubber or similar material 29, with which the clencher tires now in general use are usually provided, and in addition to the material 29 I provide a number of wires, such as 30, which wires are commonly provided in the ribs of what is known as the straight-side tire now in general use, but are less commonly used in the clencher tire. These reinforcing wires 30 are preferably constructed to extend throughout the length of the beads 21 and into the flattened portions 24, the ends of the reinforcing wires being welded together within the flattened portion 24, or the tires may be so constructed that the reinforcing wires are bent to form a U-shaped loop 31 in each of the end portions 24, the loop 31 being so positioned that the bolts 25', which are inserted through a hole formed in each of the flattened portions will contact with these loops, and since these reinforcing wires extend from one end of the tire section 20 to the other (as shown in Fig. 7) and form a loop at each end of the tire section, substantially the entire strain or pull to which the ends of my tire section may be submitted in use falls upon the strong reinforcing wires 30 instead of upon the canvas and other material of which the tire casing may be constructed.

It will be apparent that my invention is not necessarily limited to the clencher type of tire and coöperating rim, as shown in Figs. 1-5 inclusive, but that it may be used also in connection with what is known as the straight-side tire and demountable rim, as shown in Fig. 10. In this figure I have shown the tire band 12', which differs slightly from the tire band 12 shown in Figs. 4 and 5. This tire band is provided with ribs 13' positioned adjacent each edge of the band 12', similar to the ribs 13 shown in Fig. 4, but in place of the pair of ribs shown adjacent the center of the band 12 (Fig. 4) I provide a strip 32, which strip is secured to the band 12' by bolts or other securing means 33, the arrangement being such that what may be termed a trough is formed between each rib 13' and the strip 32, in which the rim section 14' is seated. The rim section 14' though similar to the rim section 14 shown in Figs. 1-6, inclusive, and secured to its wheel in the same manner, differs from the section 14 in that instead of being provided with the flanges 22, which coöperate with the clencher bead 21, it is provided with the flanges 22', which coöperate with the beads 21' formed upon the tire section 20', the beads and flanges being similar in construction to those now in general use with the straight-side tire or casing. The object in providing the strip 32 in place of the ribs shown in Figs. 4 and 5 is that this arrangement permits my device to be applied to bands of automobile truck wheels which are now in general use. A number of the automobile trucks now in use are provided with bands similar in section to the band 12' shown in Fig. 10, having the ribs or flanges 13' formed upon the opposite edges thereof. The bands upon automobile truck wheels now in use are constructed in this manner in order that the solid rubber tires may be secured thereto by providing a filling material between the band and the inner surface of the solid rubber tire, which filling material fills up the trough-like space formed by the band 12' and the ribs or flanges 13', and firmly secures the solid rubber tire to its wheel. Should it be desired to apply my improved tire formed of independent sections to an automobile truck wheel of the type just described, all that is necessary is to remove the worn out solid rubber tire and the filling material which secures the tire to the band and replace the same by my improved sectional tires, as the sectional rims 14' may be secured directly to the band 12' when the solid tire and filling material have been removed therefrom. All that is necessary is to provide drill holes through the band 12' similar to those required for the bolts 15 and 18 and valve 27, shown in Figs. 1 and 3 of the drawing, and to provide a strip, such as 32, upon the band 12', which strip serves as means for keeping the sectional rims 14' properly seated upon the band 12', and will prevent the strips from moving laterally relatively to the band. It will thus be seen that my sectional automobile tires may be quickly and easily applied to the automobile truck wheels now in use.

The arrangement of the reinforcing wires, 30 above described serves a more important function when applied to the straight-side tire section 20' shown in Figs. 10 and 11 than it does in the clencher tire section shown in the other figures, because when the tire section is provided with the clencher beads 21 and coöperating flange 22 these elements assist materially in retaining the tire casing upon its rim, but in the straight-side tire the only means provided for retaining the tire section upon its rim is the flattened portion 24' formed at each end of the tire section, which portion must be strong enough to withstand any strain to which the tire will be submitted. For this reason, the reinforcing wires 30' within the beads 21', having the loop portion 31½ are very important in the type of tire shown in Figs. 10 and 11.

It will be apparent that either the clencher tire or straight-side tire which I have described may be mounted directly upon the automobile wheel without the use of the demountable rim, and in many cases this may be desirable because of the ease with which my tire sections may be removed from and applied to the demountable rim or fixed rim with which the automobile wheel may be provided.

It will also be apparent that the ends of the tire section 24 may be secured to the demountable rims or to the fixed rims with which the wheel may be provided by numerous means other than the bolt 25' and the clamp 25 herein described.

It is believed that it will be apparent from the above description of my improved device that it possesses many desirable features over the tires now in general use, one being that the tire section may be very easily removed from or applied to the sectional rim, and that the sectional rim may be very easily and quickly removed from or secured to its wheel. It will thus be seen that the difficulty of replacing a punctured tire by a new one, or of repairing the punctured tire, will be materially less by my sectional tire over the tires now in general use. Furthermore, it will be apparent that should a truck, the wheels of which are provided with a plurality of tires each consisting of the tire sections herein disclosed become punctured, in all probability the truck could continue its journey without having to stop for repairs, since the remaining tire sections which are still inflated would probably be sufficient to carry the load for the remaining part of the trip.

When a wheel is provided with two complete tires, each made up of my tire sections, the tires should have their sections so positioned relatively to each other that the spaces between two tire sections in one tire will be substantially midway between the ends of the two tire sections upon the other tire, as shown in Fig. 2. If the wheel is provided with more than two tires made up of my tire sections, as shown in Fig. 6, the sections should be so positioned about the wheel that the ends of the sections on adjacent tires will not lie opposite each other. The angular distance between the ends of two tire sections has not been shown quite as great in Fig. 6 as probably will be found desirable in practice; this particular showing, however, is desirable, as it clearly illustrates that these tires are not unbroken rings like the tires now in general use.

Although I have shown and described a sectional tire extending substantially half-way, around its wheel, it will be apparent that in some uses of my invention it may be found desirable to provide tire sections that will extend considerably less than half-way around the wheel, and in other uses it may be desirable to provide tire sections having closed ends which extend approximately entirely around the wheel.

I have not attempted to illustrate and describe the numerous modifications of the constructions which may be adopted within the scope of the invention as defined in the claims.

What I claim is:

1. In combination with an automobile wheel, a tire band upon said wheel having spaced ribs formed upon the outer periphery thereof, a demountable rim for said wheel consisting of a plurality of independently removable rim sections mounted upon said band, each section being provided with means for securing the same to said band and held against lateral movement in either direction by said ribs, each removable section being provided with an inflatable section of a tire having flattened ends bolted to its rim section and removable therewith from the wheel.

2. In combination with an automobile wheel, a demountable rim for said wheel consisting of a plurality of separately removable rim sections positioned end to end about said wheel and secured thereto, said sections having formed upon their opposite edges inwardly directed tire-receiving flanges, each removable section being provided with an inflatable section of a tire comprising an outer casing or shoe having beads engaging said flanges and having flattened ends by means of which said ends may be clamped to the rim sections, and inflatable inner tubes mounted in said casings, whereby each section of a tire is removably secured to its rim section.

3. In combination with an automobile wheel, a tire band upon said wheel having spaced rim-retaining means secured to the periphery of said band, a demountable rim for said wheel consisting of a plurality of independently removable rim sections mounted upon said band end to end and held against lateral movement in either direction by said retaining means, means for securing said removable sections upon said band, each section being provided with an inflatable section of a pneumatic tire having flattened ends formed thereupon, and means for clamping the flattened ends of said tire sections to said rim sections, whereby the tire section is removably secured to its rim section and is removable from the wheel therewith.

4. In combination with an automobile wheel, a demountable rim for said wheel consisting of a plurality of separately removable rim sections positioned end to end about said wheel and secured thereto, said sections having tire positioning flanges formed upon the opposite edges thereof, each removable rim section being provided with an inflatable section of a tire, comprising an outer casing or shoe having beads coöperating with said flanges and flattened ends at each end of said casing or shoe, and having an inflatable inner tube mounted in each casing, and bolts passing through said flattened ends for securing the ends of the tire sections to the rim sections, whereby each section of a tire is removably secured to its rim section.

5. An automobile tire section, comprising a longitudinally curved inflatable member having closed ends and flattened projecting end portions, said tire section having rim engaging beads formed thereupon, said beads being provided with reinforcing strips positioned therein and extending longitudinally thereof, said reinforcing strips having a portion thereof extending into said projecting end portions to reinforce the same.

6. An automobile tire section, comprising a longitudinally curved inflatable member having closed ends and flattened projecting end portions, said section having a pair of rim engaging beads formed thereupon, means for reinforcing said beads and the projecting end portions formed upon the ends of the tire section, comprising strips of flexible material positioned within said beads and extending longitudinally thereof throughout said beads and into said projecting end portions, the adjacent ends of the strips being joined together within said projecting end portions, whereby a U-shaped reinforcing element is formed within each projecting end portion.

7. An automobile tire section, comprising a longitudinally curved inflatable member having closed ends and flattened projecting end portions, said section having a pair of rim engaging beads formed thereupon, means for reinforcing said beads and the projecting end portions formed upon the ends of the tire section, comprising a U-shaped element positioned within each of said projecting end portions, the legs of said U-shaped element being positioned within said beads, substantially as described.

8. An automobile tire section, comprising a longitudinally curved inflatable member having closed ends and flattened projecting end portions, said section having a pair of rim engaging beads formed thereupon, means for reinforcing said beads and the projecting end portions formed upon the ends of the tire section, comprising a plurality of wires positioned within said projecting end portions in the form of a loop, the legs of said loop being positioned within said beads to reinforce the same; substantially as described.

9. An automobile tire section, comprising a longitudinally curved inflatable member having closed ends and reduced projecting end portions, said end portions having holes formed therein to receive means for securing the tire sections to a wheel, rim engaging beads formed upon said sections, means for reinforcing said end portions to prevent the securing means from tearing the same, comprising a plurality of flexible members looped about said holes and having the legs thereof positioned within said beads; substantially as described.

10. An automobile tire section, comprising a hollow longitudinally curved inflatable member having closed ends, constructed to taper into flattened portions formed upon each end for securing the section to an automobile wheel, said reduced portions being provided with reinforcing means; substantially as described.

11. An automobile tire section, comprising a hollow longitudinally curved inflatable member having closed ends, constructed to taper into reduced portions formed upon each end for securing the section to an automobile wheel, said reduced portions being provided with U-shaped metal reinforcing means; substantially as described.

12. In combination with a truck wheel provided with a plurality of tires, demountable rims for securing said tires to said wheel, said wheel having a tire band surrounding the same, flanges formed rigidly upon said band positioned circumferentially about the same adjacent its lateral edges, and a separate strip secured to said band circumferentially about the same between said circumferential flanges, whereby rim-receiving troughs are formed about said band between said strip and flanges in which said demountable rims are mounted.

In witness whereof, I have hereunto set my hand on the 24th day of January, 1918.

HARRY A. WEBB.